United States Patent [19]

Brewer et al.

[11] 3,904,935

[45] Sept. 9, 1975

[54] REMOVABLE STUDS FOR ELECTRIC POWER CONSUMPTION METERS

[76] Inventors: Robert O. Brewer, 4810 N. 28th Dr., Phoenix, Ariz. 85017; Manuel A. Soto, 1219 E. Hess Ave., Phoenix, Ariz. 85034

[22] Filed: Aug. 26, 1974

[21] Appl. No.: 500,259

[52] U.S. Cl. ............... 317/107; 339/31 B; 324/149; 317/108
[51] Int. Cl.² ......................................... H02B 9/00
[58] Field of Search ............ 317/104, 105, 107, 108, 317/118; 339/36, 31, 198 M; 324/149

[56] References Cited
UNITED STATES PATENTS

| | | | |
|---|---|---|---|
| 2,643,362 | 6/1953 | Johansson | 324/149 |
| 2,805,403 | 9/1957 | Road | 317/108 |
| 3,014,195 | 12/1961 | May et al. | 339/31 R |

*Primary Examiner*—Gerald P. Tolin
*Attorney, Agent, or Firm*—Cahill, Sutton & Thomas

[57] ABSTRACT

Detachable current conducting studs for electrical power consumption meters are disclosed.

7 Claims, 3 Drawing Figures

PATENTED SEP 9 1975 3,904,935

REMOVABLE STUDS FOR ELECTRIC POWER CONSUMPTION METERS

The present invention relates to apparatus for preventing unauthorized electrical reconnection of electric power consumption meters and, more particularly, to detachable current conducting studs for electric power consumption meters.

Electric power utilities are continually beset by customers who fail to honor their obligations to pay for their consumption of electricity. Normally, a customer is given a grace period during which the outstanding bill must be satisfied. At such time as it becomes evident that the customer has no intention of paying his overdue bill, sterner measures must be taken. One of such measures is that of disconnecting the customer from the source of electrical power.

As each customer of a series of customers is usually served by the same electrical distribution line, disconnection must be accomplished at some point between the distribution line and the customer's point of use. Normally, the distribution line is electrically connected to the customer's electrical junction box through an electrical power consumption meter. Because the electrical power consumption meter must be readable by meter men and therefore must be readily accessible, it serves as a convenient point at which electrical power disconnection and reconnection can be made.

The electrical power consumption meters generally have a plurality of studs extending from the base of the meter. These studs serve as part of the circuit interconnecting the distribution line and the junction box; they also serve as a male plug for mounting the meter in a mating female socket. One of the presently commonly used means of open circuiting the distribution line and electrically disconnecting the junction box is that of fitting an insulated shield about the studs. These shields effectively electrically disconnect the distribution line from the customer's junction box. However, many knowledgeable customers are capable of detaching the meter to remove the shield and reconnect the distribution line to the junction box.

In another means for temporarily disconnecting an electrical power consumption meter, a plurality of removable electrically conducting rigid jumpers are disposed intermediate the meter and the socket. To disconnect the distribution line from the junction box, the electrical utility service man simply removes the jumpers. Again, certain knowledgeable customers can replace the jumpers with equivalent electrically conducting elements, such as ten penny nails or the like, and reconnect the distribution line to the junction box. Other systems have also been developed but most of them incur a substantial expense on the part of the electrical utility to effect disconnection and/or reconnection, or else they are generally too impractical to use. The above prior art systems are described in one or more of the following U.S. Pat. Nos.: 1,968,354, 2,643,362, 3,167,690, 3,725,745 and 3,742,355.

It is therefore a primary object of the present invention to prevent unauthorized use of electrical power.

Still another object of the present invention is to provide an anti theft system for preventing unauthorized use of electrical power which system is useable in conjunction with existing electrical power consumption meters.

Yet another object of the present invention is to provide slidably removable studs for electrical power consumption meters.

A further object of the present invention is to provide a two part stud for electrical power consumption meters having one part imbedded within the meter and another part slidably removable from the imbedded part.

These and other objects of the present invention will become apparent to those skilled in the art as the description thereof proceeds.

The present invention may be described with greater specificity and clarity with reference to the following drawings, in which.

Figure 1:
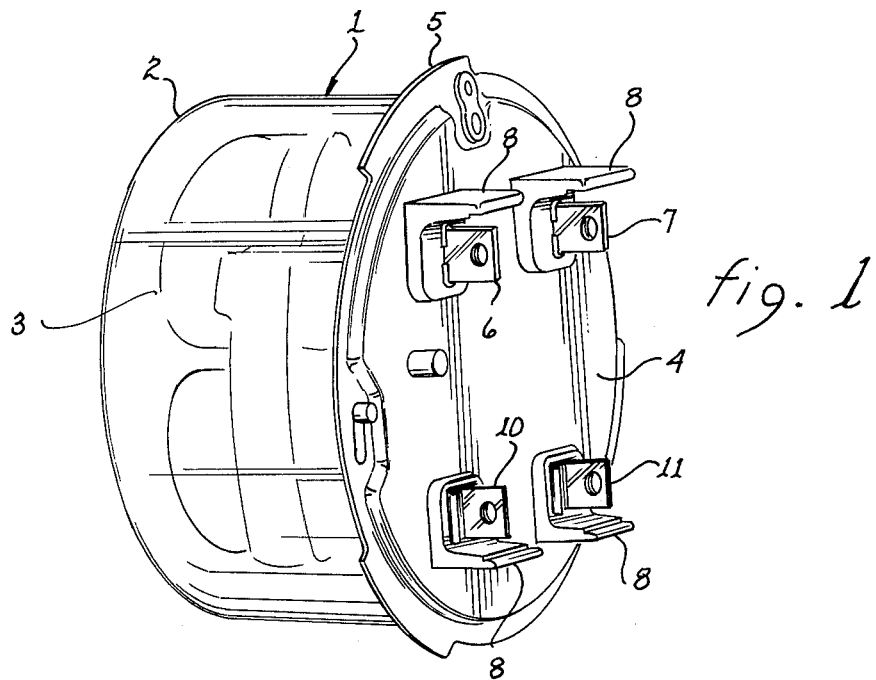
FIG. 1 illustrates the base of a conventional electrical power consumption meter incorporating the present invention.

Referring to FIG. 1, there is shown a standard electrical power consumption meter 1. Generally, such meters include a metering mechanism 3, which mechanism meters the power flowing from an electrical distribution line to a junction box and provides a visual indication of the number of kilowatt hours consumed by a customer. The mechanism is mounted upon a base 4 and enclosed within a transparent cover 2. A segmented flange 5 may circumscribe base 4 to serve as part of a locking mechanism for lockingly attaching the cover 2 to the base 4. The above described elements are generally common to most electrical power consumption meters.

The meter 1 is connected intermediate an electrical distribution line and a customer's electrical junction box by means of studs 6, 7 and studs 10, 11, respectively, extending from base 4. Stud protective and positioning elements 8 mate with correspondingly configured cavities within the meter socket.

As studs 6 and 7 are connected to the electrical distribution line with studs 10 and 11 connected to the junction box, removal of one or another of these pairs of studs will effectively open circuit the distribution line and no electrical current will flow through the meter to the junction box. Thus, electrical power to the customer can be preempted by removing one or another of these pairs of studs.

Common practice dictates that the studs directly connected to the junction box be electrically eliminated, by insulation or removal, whenever temporary or permanent disconnection of the distribution line is to be made. Pursuant to this objective, studs 10 and 11 are specifically configured to render them detachably attached to base 4 of meter 1.

Figure 2:
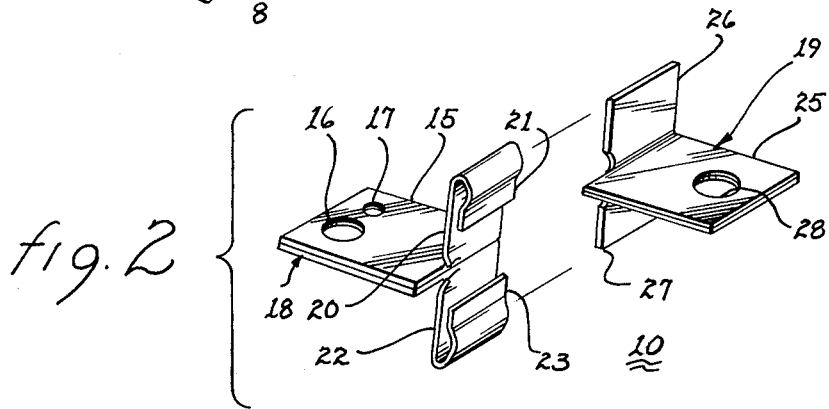
FIG. 2 illustrates the interrelationship of the elements forming the present invention.

For additional clarity in describing the configuration of identical studs 10 and 11, joint reference will be made to FIGS. 1 and 2. Stud 10, illlustrated in FIG. 2, is formed of two detachable T-shaped elements 18 and 19. Element 18 includes a base 15 having one or more apertures 16 and 17 disposed therein. Base 15 is inserted within a correspondingly shaped opening in base 4. It is electrically and mechanically bolted to electrical conductors within meter 1 by means of apertures 16 and 17. First and second arms 20 and 22 extend lateral and normal to base 15 at one end thereof. The respective ends 21 and 23 of these arms are folded to extend toward one another, whereby each arm is J-shaped in cross-section and defines a channel. When element 18 is mounted within base 4, arms 20 and 22 rest upon corresponding adjacent portions of the base. It is to be appreciated that arms 20 and 22 may be off-set of base 15 as illustrated to accommodate structural details of presently used and existing meter bases.

Element 19 includes a base 25 which may have an aperture 28 disposed therein. A pair of opposed arms 26 and 27 extend lateral and normal to base 25 at one edge thereof. The width and breadth of arms 26 and 27 are generally commensurate with the width and breadth of arms 20 and 22. With such a configuration, the arms of element 19 are slidably engageable within the channel formed by the arms of element 18. To ensure physical rigidity and good electrical contact, ends 21 and 23 may be crimped or otherwise bent to provide a spring contact against the respective inserted arms of element 19.

In FIG. 2, the drawings appear to indicate that elements 18 and 19 are of layered and laminated materials. Such construction has been selected for ease in the manufacture of certain prototypes of the present invention. However, it is to be understood that the elements may be manufactured in any one of various ways or by any one of a plurality of different techniques.

Figure 3:
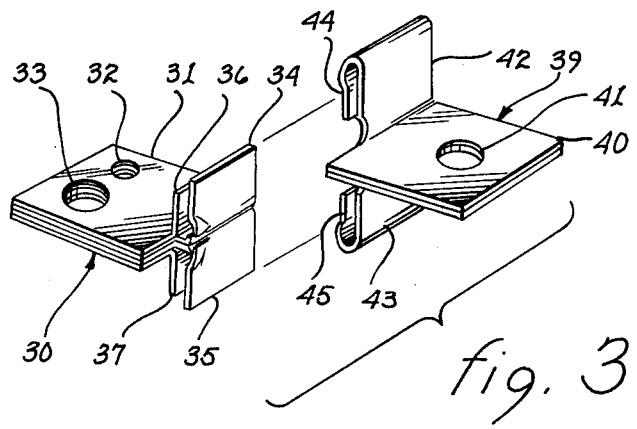
FIG. 3 illustrates a variant of the present invention.

A variant of the above described invention is illustrated in FIG. 3. Element 30 is a T-shaped element having a base 31 and a first and a second pair of parallel opposed flanges, flanges 34, 35 and flanges 36, 37, respectively. These pairs of flanges are spaced apart from one another to provide a passage therebetween and may be of equal width and length or they may be differently configured with respect to one another, depending upon the parameters of the mating element. Base 31, like base 15 shown in FIG. 2, is inserted within base 4 of meter 1 (see FIG. 1). Apertures 32 and 33 of base 31 afford a means for mechanically and electrically interconnecting element 30 to the corresponding electrical apparatus within the meter. When base 31 is located within the meter base, both pairs of flanges 34, 35 and 36, 37 are positioned adjacent the planar surface of the meter base.

The element mating with element 30 is also shown in FIG. 3 and identified by numeral 39. Element 39 is also formed as a T-shaped structure having a base 40. The base may include one or more apertures 41 for a detent interlock or a mechanical lock within the meter socket (not shown). A pair of opposed arms 42 and 43 extend from one edge of base 40 normal to the base. The ends 44 and 45 of these arms are folded over whereby each arm is J-shaped in cross-section and defines a channel.

Element 39 slidably engages element 30 in the following manner. Each of the J-shaped channels of arms 42 and 43 is configured in width and breadth to receive one flange of pair of flanges 34 and 35. Similarly, the spacing intermediate pairs of flanges 34, 35 and 36, 37 is configured to frictionally receive the respective one of ends 44 or 45. To further ensure against undesired sliding action intermediate elements 30 and 39, the ends 44 and 45 may be crimped or bent to exert pressure upon the respective adjacent flanges.

In FIG. 3, element 30 is depicted as being constructed of four laminated layers of material, where each layer includes a part corresponding in width and breadth to base 31 and a second part corresponding to one of flanges 34, 35, 36 or 37. It is to be understood that this constructional detail is simply one manner of manufacturing element 30 and that manufacturing cost requirements may dictate modifications and variations thereof. Similarly, element 39 is depicted as being formed of two layers of material where each layer includes a part equal in width and breadth to base 40 and a second part defining one of arms 42 or 43. Again, the illustration is intended to depict only one manner of constructing element 39 and it is to be understood that manufacturing or cost requirements may dictate variations and modifications thereof.

In operation, the present invention permits an electrical utility service man to disconnect the junction box from the distribution line by slidably removing elements 19 or 39, depending on whether studs 10 and 11 are constructed in accordance with the teachings of FIG. 2 or FIG. 3. The remaining electrically hot element (18 or 30) within the base of the meter is not easily reconnected to the junction box by some type of jumper. Thereby, the present invention effectively precludes the unauthorized useage, that is, theft, of electrical power from the electrical utility company subsequent to an authorized disconnection of the distribution line. At such time as reconnection is authorized, the electrical utility service man can readily manually replace elements 19 or 39 without tools or implements of any kind. Thus, reconnection is rapid and requires a minimum of the service man's time, thereby reducing the costs to the electrical utility company for such reconnection.

While it is conceivable that an element structurally related to a removed element 19 could be produced and used by a customer to effect electrical interconnection between the distribution line and the junction box, it would require a relatively clever and knowledgeable customer. From experience, customers of this caliber are generally not those who do not pay their electrical utility bills. The variant of the present invention shown in FIG. 3 reverses the roles of the elements shown in FIG. 2. Thereby, the variant renders it more difficult to produce a substitute for element 39 in that the keyed relationship between elements 30 and 39 further reduce the probability of successful unauthorized reconnection by an order of magnitude.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A two element stud for use in conjunction with electrical power consumption meters and extending from the base of a meter, said stud interconnecting an electrical distribution line to an electrical junction box through the meter, said stud comprising:
   a. a first T-shaped element having:
      1. a base extending into the meter electrically and mechanically attached to the meter; and
      2. a pair of opposed flange means extending from one edge of said first element base adjacent the meter base;
   b. a second T-shaped element having:
      1. a base, said second element base being electrically connectable to the junction box; and
      2. a further pair of opposed flange means extending from one edge of said second element base; and c. mating means slidably, electrically and mechanically connecting said pair of opposed flange means with said further pair of flange means; whereby, the electrical continuity through the meter between the electrical distribution line and the junction box can be interrupted by slidably removing said second element.

2. The stud as set forth in claim 1 wherein said mating means comprises a folded over end at the extremity of each flange of said pair of flange means, each said folded over end defining a passageway slidably receiving one flange of said further pair of flange means.

3. The stud as set forth in claim 2 wherein each said folded over end is crimped to mechanically engage the mating one of said further pair of flange means.

4. The stud as set forth in claim 1 wherein said mating means comprises a folded over end at the extremity of each flange of said further pair of flange means, each said folded over end defining a passageway slidably receiving at least a part of each of said pair of flange means.

5. The stud as set forth in claim 4 wherein each of said folded over ends are crimped to exert a force upon the mating one of said pair of flange means.

6. The stud as set forth in claim 4 wherein said pair of flange means comprises a first and second set of parallel displaced opposed pairs of flanges, said first set of pairs of flanges being slidably disposed within said passageways, and said second set of pairs of flanges maintaining mechanical and electrical contact of said folded over ends with said enfolded first set of pairs of flanges.

7. The stud as set forth in claim 6 wherein each of said folded over ends are crimped to exert a force upon the mating one of said first set of pairs of flanges.

* * * * *